(12) United States Patent
Bhasin et al.

(10) Patent No.: US 9,965,812 B2
(45) Date of Patent: *May 8, 2018

(54) GENERATING A SUPPLEMENTAL DESCRIPTION OF AN ENTITY

(71) Applicant: Microsoft Technology Licensing, LLC, Redmond, WA (US)

(72) Inventors: Anmol Bhasin, Los Altos, CA (US); Jiong Wang, San Ramon, CA (US); Abhishek Gupta, San Francisco, CA (US); Alexis Pribula, Menlo Park, CA (US); Ramesh Dommeti, San Jose, CA (US); Christian Posse, Forster City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/159,516

(22) Filed: May 19, 2016

(65) Prior Publication Data

US 2016/0343088 A1 Nov. 24, 2016

Related U.S. Application Data

(63) Continuation of application No. 14/496,914, filed on Sep. 25, 2014, now Pat. No. 9,372,930, which is a (Continued)

(51) Int. Cl.
*G06F 17/30* (2006.01)
*G06Q 50/00* (2012.01)
(Continued)

(52) U.S. Cl.
CPC .......... *G06Q 50/01* (2013.01); *G06F 17/3053* (2013.01); *G06F 17/30554* (2013.01);
(Continued)

(58) Field of Classification Search
CPC ......... G06F 17/30867; G06F 17/30702; G06F 17/30554; G06Q 10/1053; G06Q 50/01
See application file for complete search history.

(56) References Cited

U.S. PATENT DOCUMENTS 8,880,562 B2 11/2014 Bhasin et al.
9,372,930 B2 6/2016 Bhasin et al.
(Continued)

OTHER PUBLICATIONS

U.S. Appl. No. 13/428,412, now U.S. Pat. 8,880,562, filed Mar. 23, 2012, Generating a Supplemental Description of an Entity.
(Continued)

*Primary Examiner* — Tarek Chbouki
(74) *Attorney, Agent, or Firm* — Schwegman Lundberg & Woessner, P.A.

(57) ABSTRACT

A statistically overrepresented token in the descriptions of users associated with a target entity may be descriptive of the target entity. This may be true regardless of whether a primary description of the entity includes the overrepresented token. Accordingly, the entity description machine may access multiple descriptions of multiple users associated with the target entity. A portion of the multiple descriptions may each include a token descriptive of the target entity and of a subset of the multiple users. The entity description machine may determine that the token is overrepresented among the tokens within the multiple descriptions and generate a supplemental description of the target entity, where the supplemental description includes the overrepresented token. Once the supplemental description is generated, the entity description machine may use the supplemental description in referencing the target entity.

20 Claims, 9 Drawing Sheets

Related U.S. Application Data continuation of application No. 13/428,412, filed on Mar. 23, 2012, now Pat. No. 8,880,562.

(60) Provisional application No. 61/577,628, filed on Dec. 19, 2011.

(51) Int. Cl.
*G06Q 10/10* (2012.01)
*H04L 29/08* (2006.01)

(52) U.S. Cl.
CPC .. *G06F 17/30702* (2013.01); *G06F 17/30867* (2013.01); *G06Q 10/10* (2013.01); *G06Q 10/1053* (2013.01); *H04L 67/30* (2013.01); *H04L 67/306* (2013.01)

(56) References Cited

U.S. PATENT DOCUMENTS

| | | | |
|---|---|---|---|
| 9,466,071 B2* | 10/2016 | Pennacchiotti | G06Q 30/0255 |
| 2006/0136245 A1* | 6/2006 | Denissov | G06F 11/3419 |
| | | | 702/19 |
| 2009/0144226 A1 | 6/2009 | Tateno | |
| 2009/0276459 A1* | 11/2009 | Trout | G06Q 10/10 |
| 2009/0307038 A1* | 12/2009 | Chakra | G06Q 10/109 |
| | | | 705/7.18 |
| 2009/0319518 A1 | 12/2009 | Koudas et al. | |
| 2010/0179874 A1 | 7/2010 | Higgins et al. | |
| 2010/0293479 A1 | 11/2010 | Rousso et al. | |
| 2010/0306824 A1 | 12/2010 | Gurney et al. | |
| 2011/0173198 A1* | 7/2011 | Malleshaiah | G06F 17/30867 |
| | | | 707/737 |
| 2011/0184943 A1 | 7/2011 | Norton et al. | |
| 2012/0016729 A1 | 1/2012 | Higgins et al. | |
| 2013/0013526 A1* | 1/2013 | Le Viet | G06Q 10/06 |
| | | | 705/319 |
| 2013/0117058 A1 | 5/2013 | Norton et al. | |
| 2013/0159293 A1 | 6/2013 | Bhasin et al. | |
| 2015/0081576 A1 | 3/2015 | Bhasin et al. | |

OTHER PUBLICATIONS

U.S. Appl. No. 14/496,914, now U.S. Pat. No. 9,372,930, filed Sep. 25, 2014, Generating a Supplemental Description of an Entity.

"U.S. Appl. No. 13/428, 412, Preliminary Amendment Filed Mar. 23, 2012", 3 pgs.

"U.S. Appl. No. 13/428,412, Final Office Action dated Mar. 31, 2014", 15 pgs.

"U.S. Appl. No. 13/428,412, Non Final Office Action dated Oct. 25, 2013", 15 pgs.

"U.S. Appl. No. 13/428,412, Notice of Allowance dated Jul. 8, 2014", 8 pgs.

"U.S. Appl. No. 13/428,412, Response filed Jan. 24, 2014 to Non Final Office Action dated Oct. 25, 2013", 17 gps.

"U.S. Appl. No. 13/428,412, Response filed Jun. 26, 2014 to Final Office Action dated Oct. 31, 2014", 16 pgs.

"U.S. Appl. No. 14/496,914, Notice of Allowance dated Feb. 25, 2016", 16 pgs.

"U.S. Appl. No. 14/496,914, Preliminary Amendment filed Nov. 4, 2014", 8 pgs.

* cited by examiner

GENERATING A SUPPLEMENTAL DESCRIPTION OF AN ENTITY

RELATED APPLICATIONS

This patent application is a Continuation of U.S. patent application Ser. No. 14/496,914, filed Sep. 25, 2014, which is a Continuation of U.S. patent application Ser. No. 13/428, 412, filed Mar. 23, 2012, which claims the benefit of priority, under 35 U.S.C. § 119(e), to U.S. Provisional Patent Application Ser. No. 61/577,628, filed on Dec. 19, 2011, which applications are incorporated herein by reference in their entirety.

TECHNICAL FIELD

The subject matter disclosed herein generally relates to the processing of data. Specifically, the present disclosure addresses systems and methods of generating a supplemental description of an entity.

BACKGROUND

Modern network-based systems may describe one or more entities by maintaining a profile for each entity. A profile of the entity typically includes one or more descriptors that describe the entity or its attributes (e.g., characteristics). For example, an entity may be a person (e.g., a person that has registered as a user of a network-based system), and the profile of the person may include descriptors the person's age (e.g., 25 years old), location (e.g., Los Angeles, Calif.), gender (e.g., male), occupation (e.g., engineer), employer (e.g., LinkedIn Corp.), or any suitable combination thereof.

In some network-based systems, an entity may be associated (e.g., correlated, related, affiliated, or otherwise connected) with one or more users of a network-based system or database. For example, a network-based system may include a database of entity-user associations that stores records of correspondence relationships (e.g., correspondences) between an entity and one or more users. A user of a network-based system may itself be an entity with a profile and may be associated with other entities and other users. Network-based systems that provide social networking services to their users typically maintain sophisticated databases of entity-user associations.

BRIEF DESCRIPTION OF THE DRAWINGS

Some embodiments are illustrated by way of example and not limitation in the figures of the accompanying drawings.

DETAILED DESCRIPTION

Figure 1:
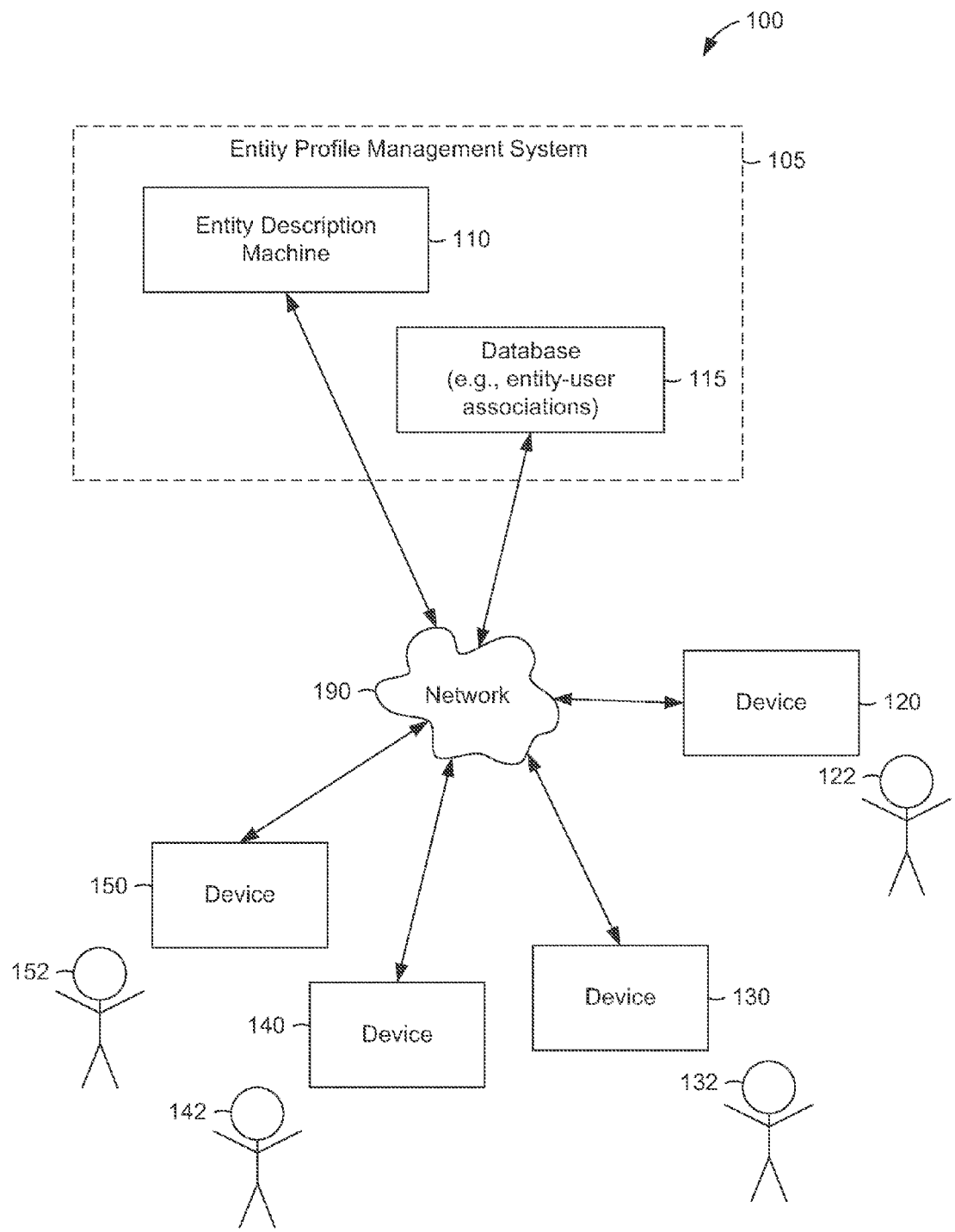
FIG. 1 is a network diagram illustrating a network environment suitable for generating a supplemental description of an entity, according some example embodiments.

Example methods and systems are directed to generating a supplemental description of an entity (e.g., a target entity). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An entity may be described by a primary description (e.g., primary profile or actual profile) of that entity. The primary description of the entity may include descriptors that describe the entity or its attributes. For example, one or more descriptors of the primary description may be defined by the target entity itself, by social network of the target entity, by algorithmic calculation, or any suitable combination thereof. However, it is possible for the primary description of the entity to be incomplete, misleading, or otherwise vulnerable to error in describing the target entity. Hence, an entity may be targeted for generation of a supplemental description (e.g., secondary profile or virtual profile) that complements, enhances, or replaces its primary description. Generation of a supplemental description of the target entity may be performed by an entity description machine, which may form part or all of the entity management system. Such an entity management system may form all or part of a network-based system (e.g., for providing and maintaining a social networking service).

The entity description machine may generate the supplemental description of the target entity by analyzing tokens within multiple descriptions of the multiple users associated with the target entity and determining one or more statistically overrepresented tokens. That is, a statistically overrepresented token in the descriptions of users associated with the target entity may be descriptive of the target entity. This may be true regardless of whether the primary description of the entity includes the overrepresented token (e.g., within the descriptors of the primary description for that target entity). Accordingly, the entity description machine may access the multiple descriptions of the multiple users associated with the target entity. A portion of the multiple descriptions may each include a token descriptive of the target entity and of a subset of the multiple users. The entity description machine may determine that the token is overrepresented among the tokens within the multiple descriptions and generate a supplemental description of the target entity, where the supplemental description includes the overrepresented token.

Once the supplemental description is generated, the entity description machine may use the supplemental description in referencing the target entity. For example, the entity description machine may present a search result that references the target entity, based on the supplemental description (e.g., based on the supplemental description in conjunction with one or more search criteria or keywords). As another example, the entity description machine may rank (e.g., sort, order, prioritize, or highlight) a search result that references the target entity, based on the supplemental description (e.g., rank one or more search results for relevance based on the supplemental description). As another example, the entity description machine may provide a recommendation of the target entity, based on the supplemental description. As a further example, the entity description machine may provide a suggestion that an author (e.g., the target entity or a user with administrative privileges to represent the target entity) of the primary description of the target entity modify the primary description, based on the supplemental description generated by the entity description machine.

FIG. 1 is a network diagram illustrating a network environment 100 suitable for generating a supplemental description of an entity, according to some example embodiments. The network environment 100 includes the entity description machine 110, a database 115, and devices 120, 130, 140, and 150, all communicatively coupled to each other via a network 190. The entity description machine 110, and the database 115 may form all or part of an entity profile management system 105, which may form all or part of a network-based system (e.g., a social networking system, an electronic shopping system, an online gaming system, a blogging system, or any suitable combination thereof). The entity description machine 110 may be configured (e.g., by software) to perform generation of a supplemental description of an entity (e.g., as described below with respect to FIG. 6-8). The database 115 may store one or more entity-user associations (e.g., as part of maintaining or providing a social networking service). The entity description machine 110, the database 115, and the devices 120, 130, 140, and 150 may each be implemented in a computer system, in whole or in part, as described below with respect to FIG. 9.

Also shown in FIG. 1 are users 122, 132, 142, and 152. One or more of the users 122, 132, 142, and 152 may be a human user (e.g., a human being), a machine user (e.g., a computer configured by a software program to interact with a device), or any suitable combination thereof (e.g., a human assisted by a machine or a machine supervised by a human). The user 122 is not part of the network environment 100, but is associated with the device 120 and may be a user of the device 120. For example, the device 120 may be a desktop computer, a vehicle computer, a tablet computer, a navigational device, a portable media device, or a smart phone belonging to the user 122. Similarly, the user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 142 is not part of the network environment 100, but is associated with the device 140 and may be a user of the device 140. For example, the device 140 may be a desktop computer, a vehicle computer, a tablet computer, a navigational device, a portable media device, or a smart phone belonging to the user 142. Furthermore, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, a not-only-SQL (NoSQL) key value store, or any suitable combination thereof. Moreover, any two or more of the machines illustrated in FIG. 1 may be combined into a single machine, and the functions described herein for any single machine may be subdivided among multiple machines.

The network 190 may be any network that enables communication between machines (e.g., entity description machine 110 and the device 120). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
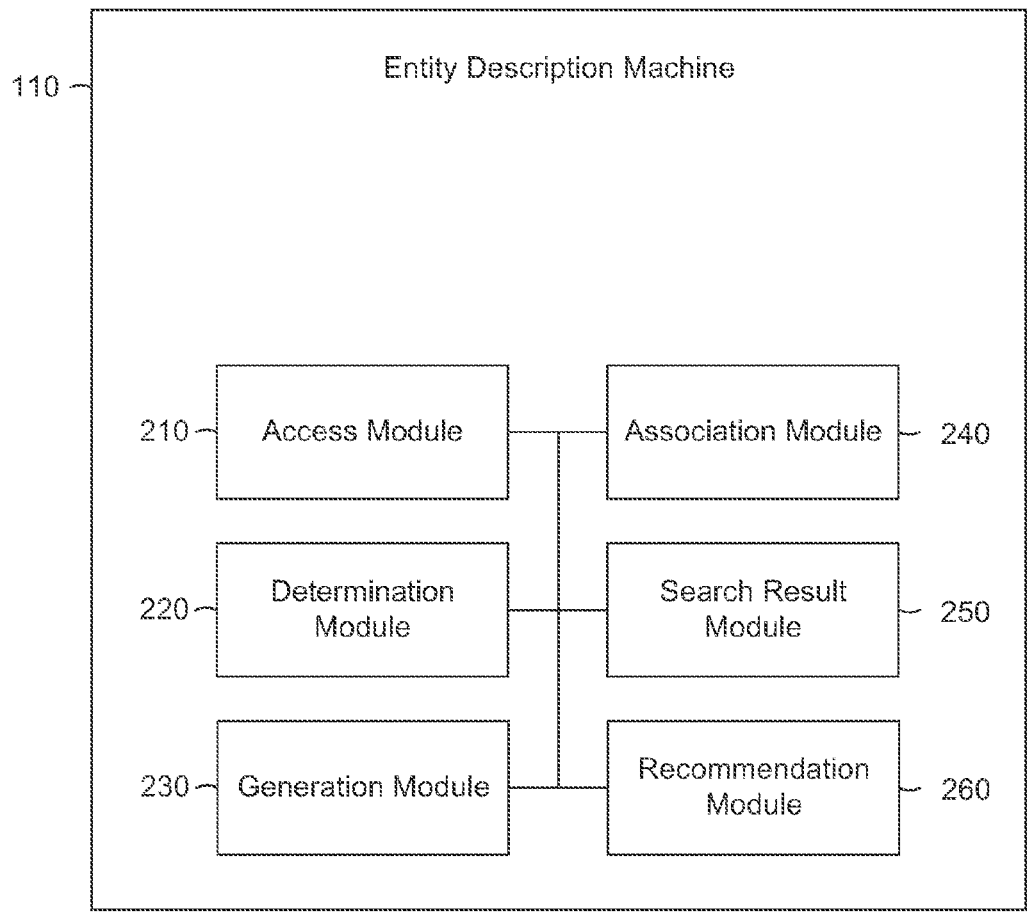
FIG. 2 is a block diagram illustrating components of an entity description machine, according to some example embodiments.

FIG. 2 is a block diagram illustrating components of the entity description machine 110, according to some example embodiments. The entity description machine 110 includes an access module 210, a determination module 220, a generation module 230, an association module 240, a search result module 250, and a recommendation module 260, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules. Further details of the access module 210, the determination module 220, the generation module 230, the association module 240, the search result module 250, and the recommendation module 260 are described below with respect to FIG. 6-8.

Figure 3:
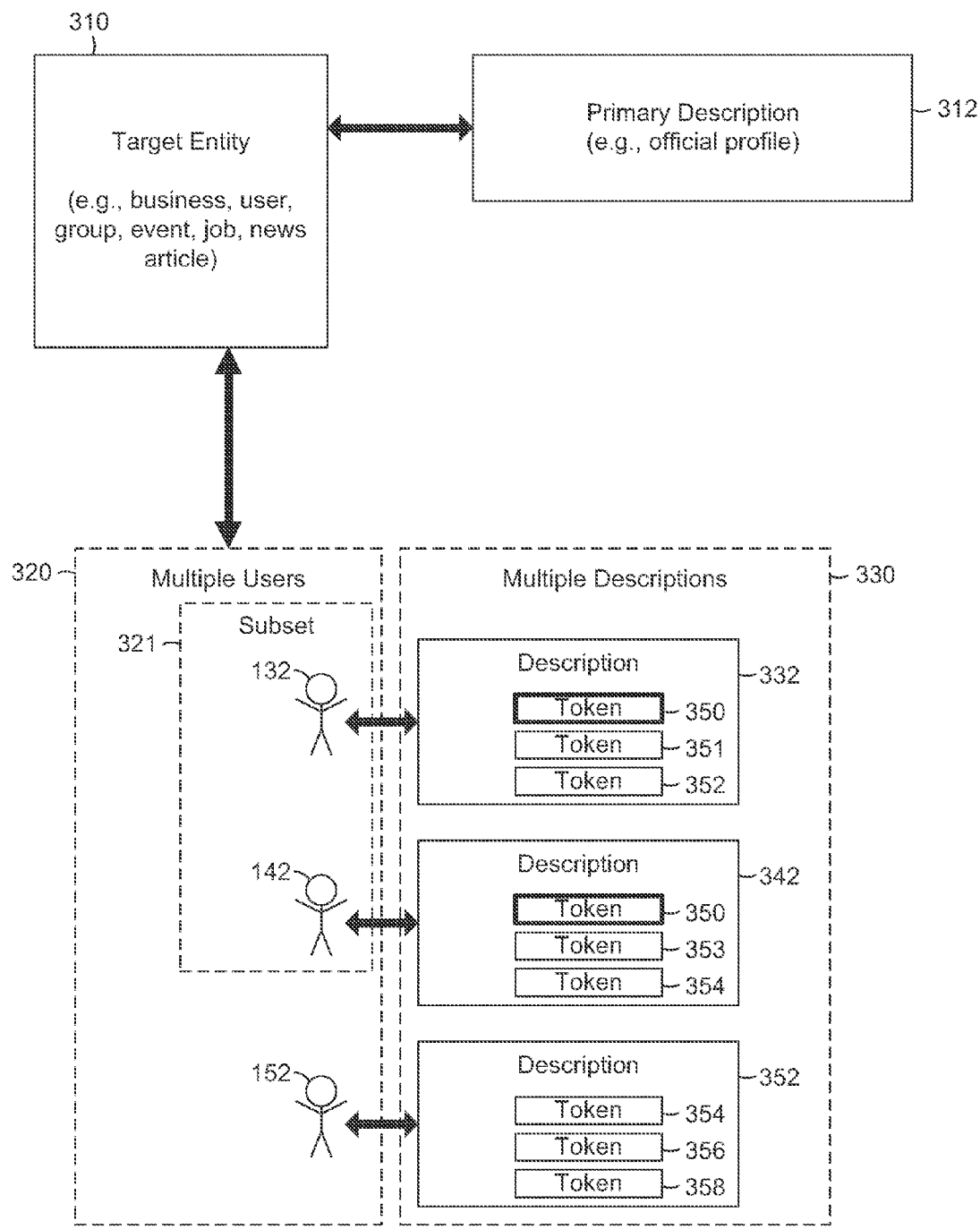
FIG. 3 is a conceptual diagram illustrating a target entity being described by a corresponding primary description, as well as multiple users being described by corresponding multiple descriptions, according to some example embodiments.

FIG. 3 is a conceptual diagram illustrating a target entity 310 being described by a corresponding primary description 312, as well as multiple users 320 being described by corresponding multiple descriptions 330, according to some example embodiments. The target entity 310 may be any entity describable (e.g., by the primary description 312). Examples of such entities include a business, a user (e.g., of a network-based system), a group (e.g., users of the network-based system), an event (e.g., scheduled within a calendar stored by the database 115), a job (e.g., a job posting that describes the job), a news article (e.g., a document), a digital forum discussion (e.g., a thread of questions, answers, and comments on a topic), or any suitable combination thereof. The primary description 312 of the target entity 310 corresponds to the target entity 310 and describes the target entity 310 using one or more descriptors. A descriptor may include one or more tokens (e.g., phrases, symbols, words, tags, codes, characters, numbers, or strings). Tokens may be separated by one or more special characters (e.g., spaces, tabs, commas, slashed, or backslashes) within a descriptor. According to various example embodiments, a description (e.g., primary description 312) may be multilingual. That is, the primary description 312 may include descriptors or tokens that are written in more than one language. Moreover, a descriptor or a token may be a character string or numeric code with no intrinsic semantic definition (e.g., "XdKW53CG"). In some example embodiments, each token processed by the entity description machine 110 is or has a unique identifier that allows the token to be identified among the various tokens in descriptions of users.

The primary description 312 may be a profile of the target entity 310. In some example embodiments, the primary descriptor 312 is an official profile of the target entity 310 (e.g., authored by an official representative of the target entity 310). However, in some situations, the primary description 312 may be incomplete, misleading, or otherwise vulnerable to error in describing the target entity 310. According to some example embodiments, the primary description 312 is stored by the database 115.

The multiple users 320 are associated (e.g., voluntarily) with the target entity 310. As shown, the multiple users 320 includes the users 132, 142, and 152, and the multiple users 320 are described by the multiple descriptions 330, each of which respectively corresponds to one of the multiple users 320. As examples, the description 332 may correspond to the user 132 and may describe the user 132; the description 342 may correspond to the user 142 and may describe the user 142; and the description 352 may correspond to the user 152 and may describe the user 152. In some example embodiments, each of the multiple descriptions 330 references the target entity 310. For example, each of the multiple descriptions 330 may include a token (e.g., token 350 or token 354) that references (e.g., indicates, identifies, or defined) the target entity 310. As noted above, a description may include one or more tokens (e.g., within one or more descriptors). In some example embodiments, all or part of the multiple descriptions 330 is stored in the database 115. As shown, the description 332 of the user 132 includes tokens 350, 351, and 352, which may be descriptive of the user 132. In contrast, the description 342 of the user 142 includes tokens 350, 353, and 354, which may be descriptive of the user 142. Moreover, the description 352 of the user 152 includes tokens 354, 356, and 358, which may be descriptive of the user 152.

In some example embodiments, the target entity 310 is a business; the primary description 312 describes the target entity 310 as the business; the multiple users 320 are employees of the business; and the multiple descriptions 330 describe the multiple users 320 as employees of the business. In certain example embodiments, the target entity 310 is a user (e.g., of a social networking service); the primary description 312 describes the target entity 310 as the user; the multiple users 320 are further users (e.g., of the social networking service); and the multiple descriptions 330 describe the multiple users 320 as further users who are connections of the user (e.g., with respect to the social networking service). Similarly, the target entity 310 may be a group of users; the primary description 312 may describe the target entity 310 as the group of users; the multiple users 320 may be members of the group of users; and the multiple descriptions 330 may describe the multiple users 320 as members of the group of users. According to certain example embodiments, the target entity 310 may be a group of users; the primary description 312 may describe the target entity 310 as the group of users; the multiple users 320 may be members of the group of users; and the multiple descriptions 330 may be written submissions (e.g., comments, questions, or answers) contributed by the multiple users 320.

In some example embodiments, the target entity 310 is an event (e.g., scheduled in a calendar stored by the database 115); the primary description 312 describes the target entity 310 as the event; the multiple users 320 are attendees of the event (e.g., invited, responded, or confirmed); and the multiple descriptions 330 describe the multiple users 320 as attendees of the event. In certain example embodiments, the target entity 310 is a job (e.g., a job posting that describes an available employment position); the primary description 312 describes the target entity 310 as the job; the multiple users 320 are applicants to the job; and the multiple descriptions 330 describe the multiple users 320 as applicants to the job. In various example embodiments, the target entity 310 is a news article (e.g., a document available for viewing or sharing); the primary description 312 describes the target entity 310 as the news article; the multiple users 320 are viewers or sharers of the news article; and the multiple descriptions 330 describe the multiple users 320 as viewers or sharers of the news article. According to some example embodiments, the target entity 310 is a discussion thread (e.g., in an online forum for questions, answers, polls, or comments); the primary description 312 describes the target entity 310 as the discussion thread; the multiple users 320 are participants in the discussion thread (e.g., a poster, an asker, an answerer, a commenter, or a voter); and the multiple descriptions 330 describe the multiple users 320 as participants in the discussion thread.

Each of the multiple users 320 (e.g., user 132, 142, and 152) may be voluntarily associated with the target entity 310 on an individual basis (e.g., by individual voluntary decisions to be so associated). A voluntary association between a user and the target entity 310 may be detected by receiving an indication of a voluntary decision by the user (e.g., user 132) to be voluntarily associated with the target entity 310. For example, the token 352 may indicate (e.g., identify) the target entity 310, and the user 132 may voluntarily associate himself with the target entity 130 by editing his description 332 to include the token 352. More specifically, the token 352 may be a name or title of the target entity 310, and the editing of the description 332 to be inclusive of this name or title may be an indication of a voluntary decision by the user 132 to be voluntarily associated with the target entity 310. As another example, the token 352 may be an indication (e.g., a status flag, a preference, or a reference to a transaction record) that the user 132 has subscribed to news or information regarding the target entity 310. As a further example, the token 352 may be an indication that the user 132 maintains a list of "favorites" that references the target entity 310. As yet another example, the token 352 may be an indication that the user 132 has recently searched for information regarding the target entity 310 or browsed its primary description 312.

The token 350 is shown with a highlighted border in the descriptions 332 and 342, thus indicating that the token 350 may be an overrepresented token within the tokens 350, 351, 352, 353, 354, 356, and 358 in the multiple descriptions 330. Since the descriptions 332 and therefore do corresponds to the users 132 and 142, a subset 321 of the multiple users 20 may be defined, as shown, to include the users 132 and 142. The subset 321 may therefore correspond to a portion of the multiple descriptions 330 (e.g., descriptions 332 and 342). According to various example embodiments, an overrepresented token (e.g., token 350) that describes the subset 321 of the multiple users 320 may be also used to describe the target entity 310, which may be voluntarily associated with the subset 321 of the multiple users 320.

Figure 4:
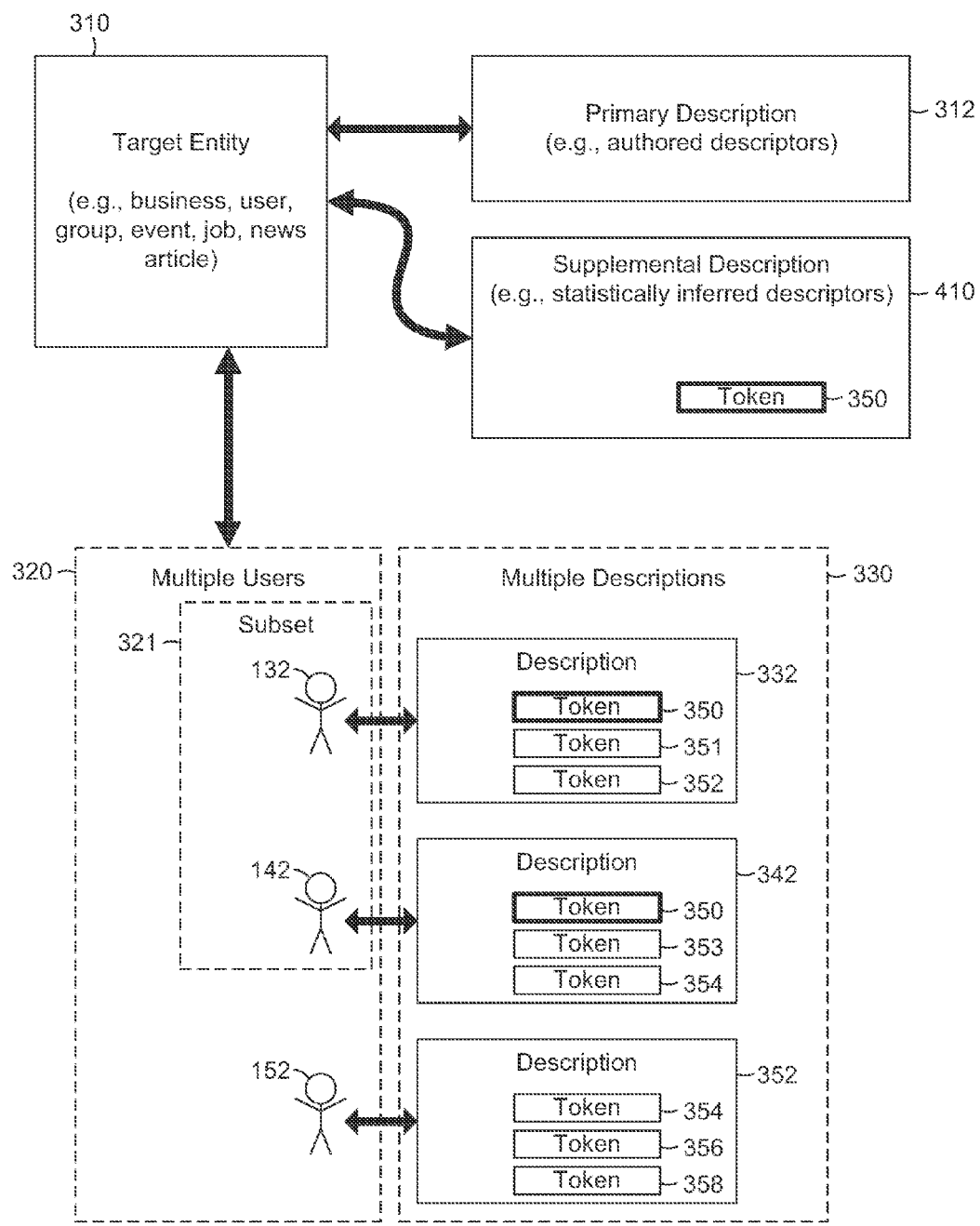
FIG. 4 is a conceptual diagram illustrating the target entity being described by its primary description and a corresponding supplemental description, as well as multiple users being described by corresponding multiple descriptions, according to some example embodiments.

FIG. 4 is a conceptual diagram illustrating the target entity 310 being described by its primary description 312 (e.g., a primary profile or an actual profile) and a corresponding supplemental description 410 (e.g., a secondary profile or a virtual profile), as well as the multiple users 320 being described by the multiple descriptions 330, according to some example embodiments. The supplemental description 410 may be generated based on the token 350, which may be determined as to be overrepresented among the tokens 350 in the multiple descriptions 330.

As shown in FIG. 4, the supplemental description 410 includes the token 350. The supplemental description 410 describes the target entity 310 and may include information (e.g., token 350) that is absent from the primary description 312. Accordingly, the supplemental description 410 may provide a complement, an enhancement, or a replacement for the primary description 312 (e.g., within the entity profile management system 105).

In some example embodiments, the token 350 indicates a skill possessed by each of the subset 321 of the multiple users 320 (e.g., as employees of a business or applicants to a job) and utilized by the target entity 310 (e.g., as a business or job). In certain example embodiments, the token 350 indicates a location of the subset 321 of the multiple users 320 (e.g., as employees, users, or applicants) and of the target entity 310 (e.g., as a business, a group, an event, or a job). In various example embodiments, the token 350 indicates a job title held by the subset 321 of the multiple users 320 (e.g., as employees or applicants) and utilized by the target entity 310 (e.g., as a business, nonprofit, or governmental organization).

According to certain example embodiments, the token 350 indicates a school from which each of the subset 321 of the multiple users 320 graduated (e.g., within a period of time). According to some example embodiments, the token 350 indicates an industry in which the subset 321 of the multiple users 320 work (e.g., as employees, users, members, or applicants) and to which the target entity 310 pertains (e.g., as a business, a group, an event, or a news article).

Figure 5:
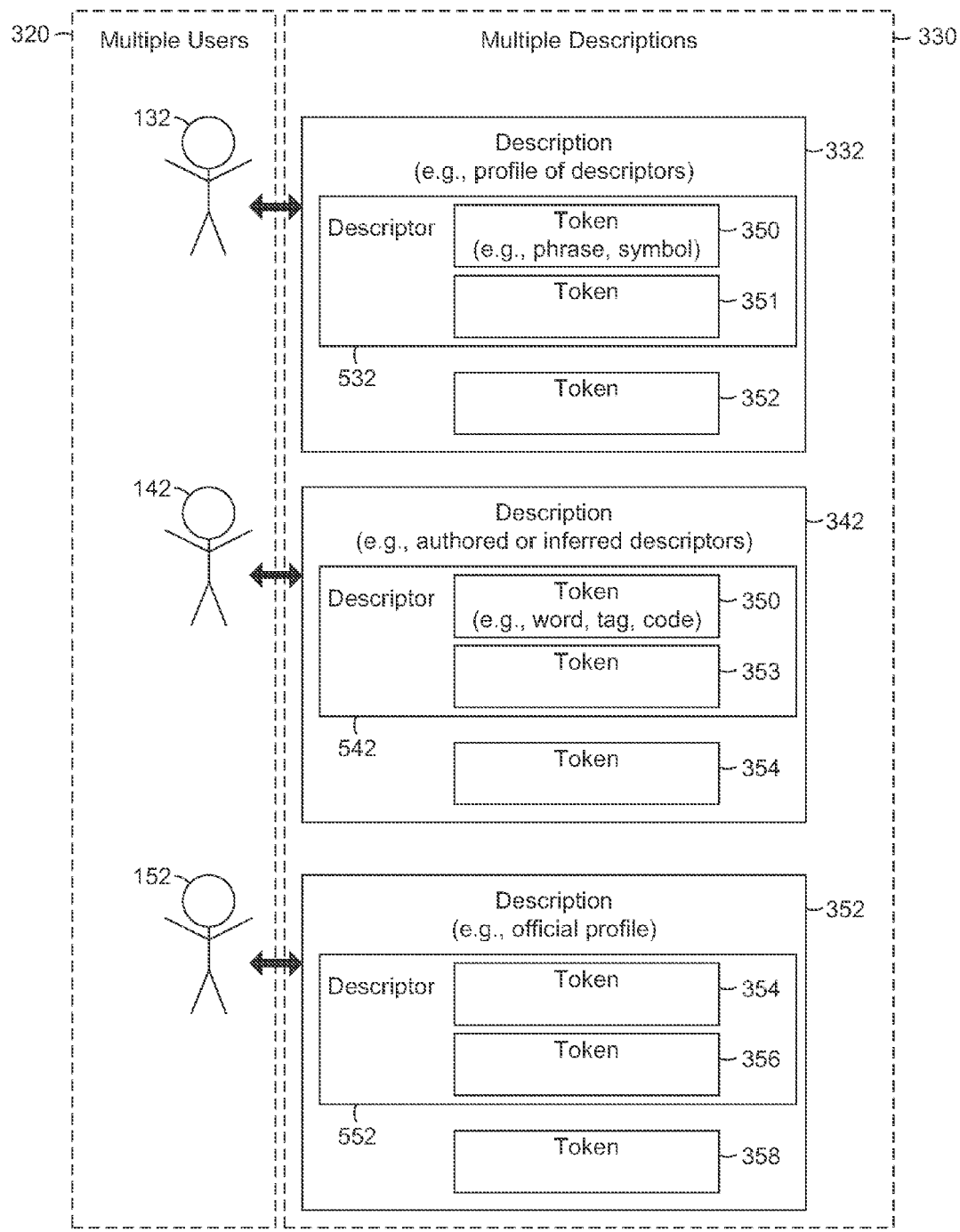
FIG. 5 is a conceptual diagram illustrating multiple users being described by corresponding multiple descriptions, according to some example embodiments.

FIG. 5 is a conceptual diagram illustrating further detail in the multiple users 320 being described by the multiple descriptions 330, according to some example embodiments. As shown, the description 332 of the user 132 may include a descriptor 532, and the tokens 350 and 351 may be included in the descriptor 532. The token 352 is shown as a standalone token. Similarly, the description 342 of the user 142 may include the descriptor 542, and the tokens 350 and 353 may be included in the descriptor 542, where the token 354 may be a standalone token within the description 342. Likewise, the description 352 of the user 152 may include the descriptor 552, which may include the tokens 354 and 356, with the token 358 being included in the description 352 as a standalone token. Any one or more of the descriptors 532, 542, and 552, may be an authored descriptor (e.g., expressly written or selected by the user described), an inferred descriptor (e.g., written or selected by a machine based on attributes or behaviors of the user described), or any suitable combination thereof.

Figure 6:
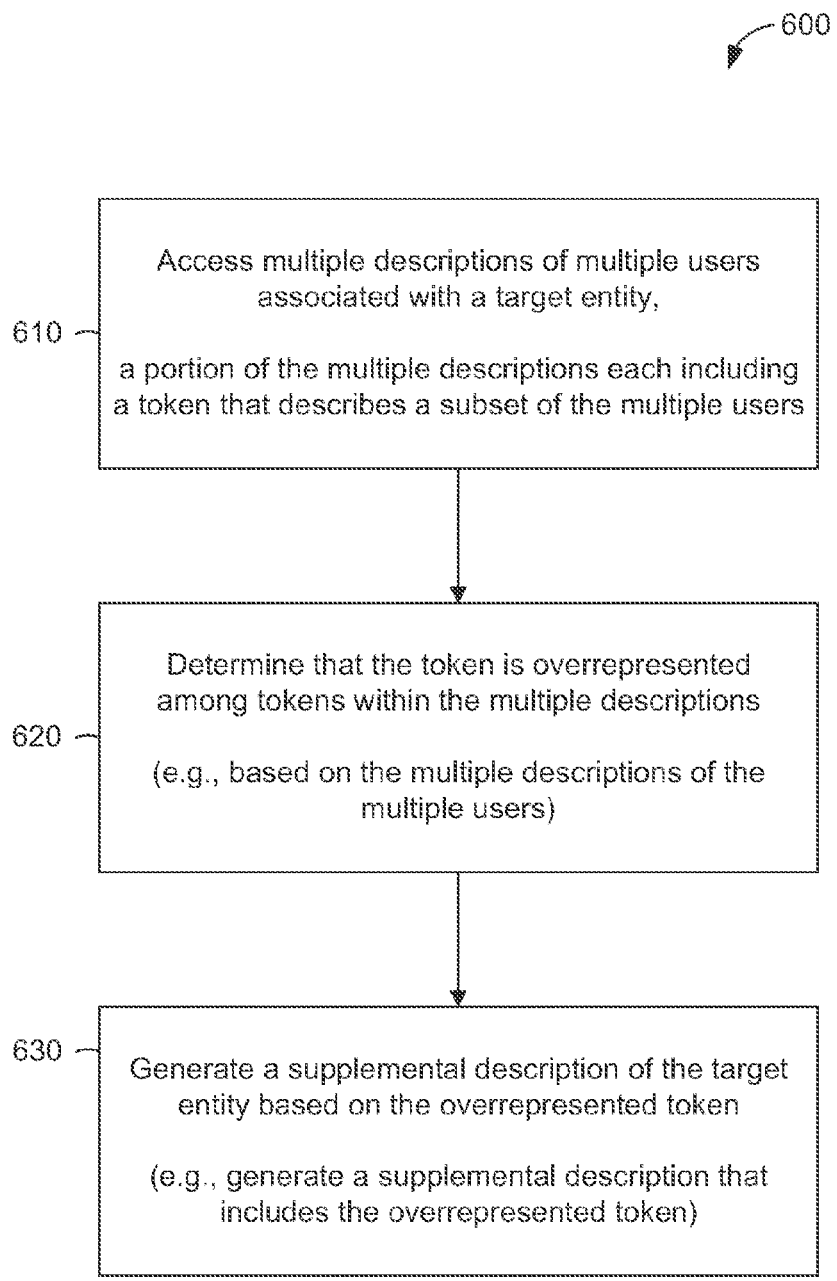
FIG. 6-8 are flowcharts illustrating operations of the entity description machine in performing a method of generating a supplemental description of a target entity, according to some example embodiments.
Figure 7:
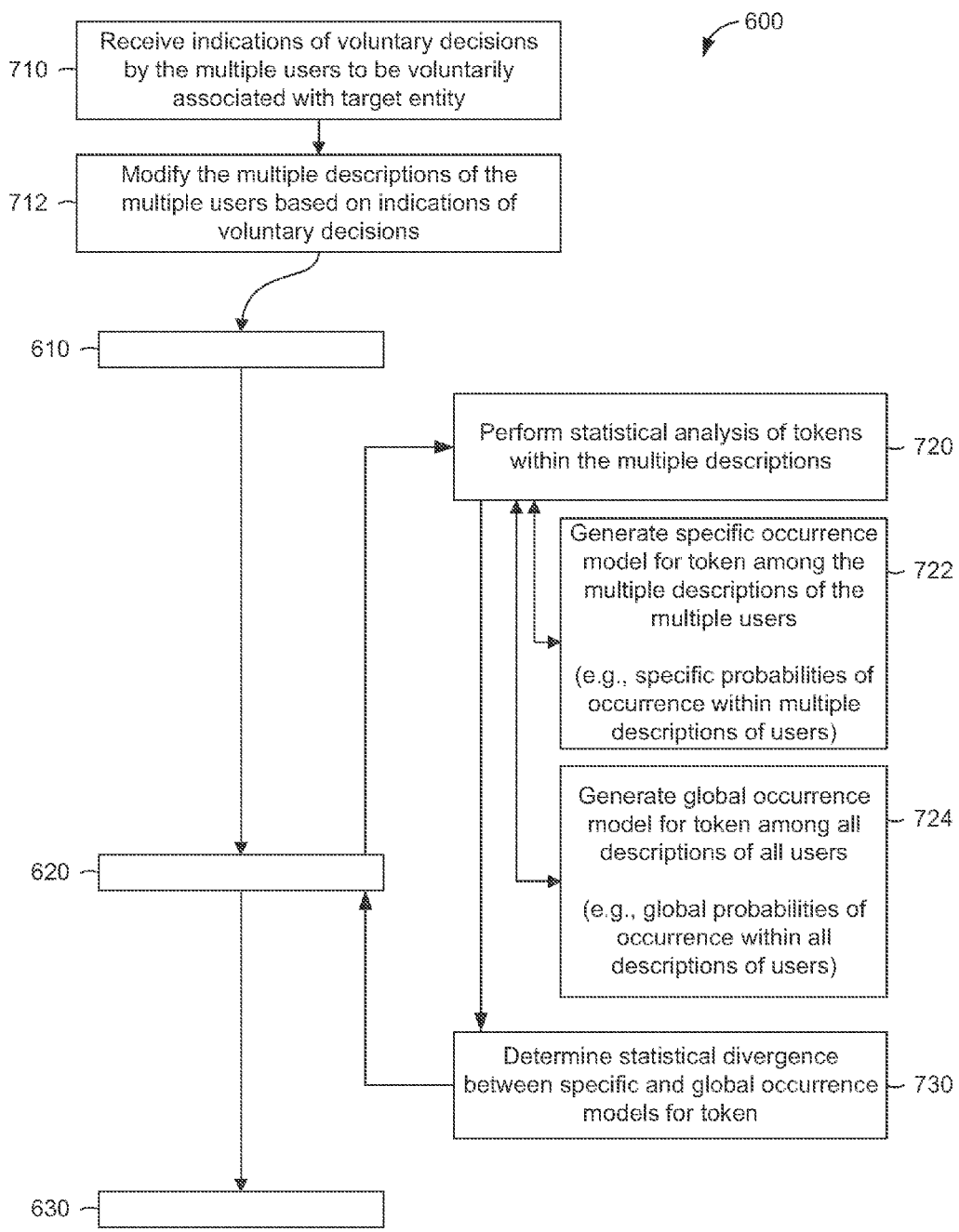
Figure 8:
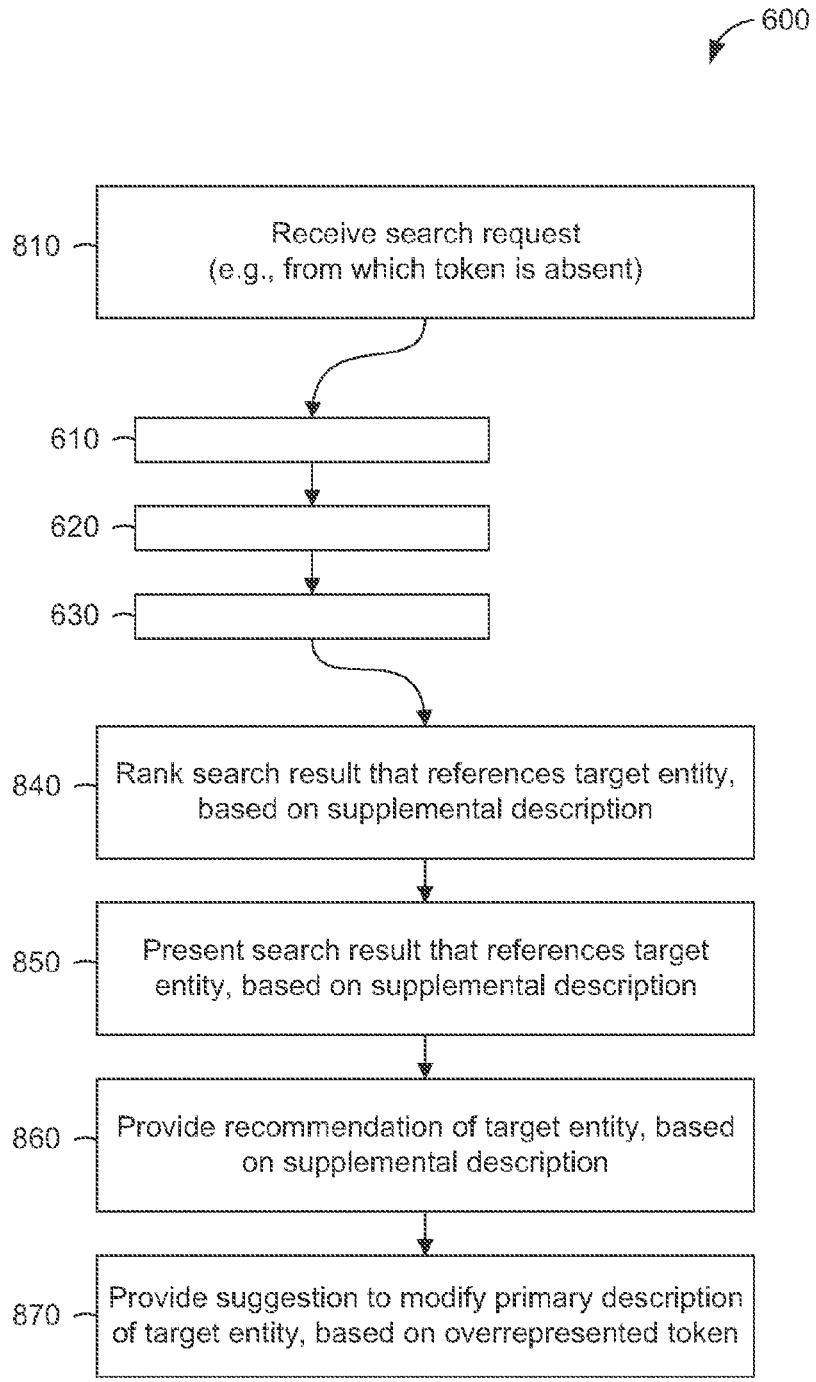

FIG. 6-8 are flowcharts illustrating operations of a method 600 of generating the supplemental description 410 of the target entity 310, according to some example embodiments. Operations in the method 600 may be performed by the entity description machine 110, using modules described above with respect to FIG. 2. As shown in FIG. 6, the method 600 includes operations 610, 620, and 630.

In operation 610, the access module 210 accesses the multiple descriptions 330 (e.g., from the database 115). As noted above, the multiple descriptions 330 may describe the multiple users 320 or may be written submissions (e.g., comments, questions, or answers) contributed by the multiple users 320. Moreover, the multiple users 320 may be associated with the target entity 310 by the database 115, which may store one or more entity-user associations. In some example embodiments, the multiple descriptions 330 each reference the target entity 310 (e.g., via token 350 and token 354). As also noted above, the target entity 310 may be described by the primary description 312, from which the token 350 may be absent.

In operation 620, the determination module 220 determines that the token 350 is overrepresented among the tokens (e.g., tokens 350, 351, 352, 353, 354, 356, and 358) in the multiple descriptions 330. Accordingly, the token 350 may be descriptive of the target entity 310 and descriptive of the subset 321 of the multiple users 320 (e.g., users 132 and 142). Operation 620 may be performed based on the multiple descriptions 330 accessed in operation 610.

In operation 630, the generation module 230 generates the supplemental description 410 of the target entity 310, which may be associated with the multiple users 320. As noted above, the supplemental description 410 may include the token 350, which may be determined in operation 620 as an overrepresented token among the tokens and the multiple descriptions 330. Operation 630 may be performed based on the overrepresented token (e.g., token 350). As noted above, the supplemental description 410 may be generated to include the overrepresented token (e.g., token 350) determined in operation 620, as well as additional (e.g., further) overrepresented tokens (e.g., the top 10, 25, or 100 most overrepresented tokens).

As shown in FIG. 7, the method 600 may include one or more of operations 710, 712, 720, 722, 724, and 730. Operations 710 and 712 are shown as being performed prior to operation 610. In operation 710, the association module 240 receives one or more indications of voluntary decisions by the multiple users 320 to be voluntarily associated with the target entity 310. For example, the association module 240 may receive multiple indications (e.g., signals, messages, flags, profile updates, or programmatic calls), where each of the multiple indications indicates that one of the multiple users 320 (e.g., user 132) made a voluntary decision to be voluntarily associated with the target entity 310. Examples of voluntary decisions and voluntary associations are discussed above with respect to FIG. 3.

In operation 712, the association module 240 modifies the multiple descriptions 330 based on the indications of voluntary decisions received in operation 710. After performance of operation 712, the modified multiple descriptions 330 describe the multiple users 320 as being voluntarily associated with the target entity 310 (e.g., by the indicated voluntary decisions).

One or more of operations 720 and 730 may be performed as part (e.g., a precursor task, a subroutine, or a portion) of operation 620, in which the determination module 620 determines that the token 350 is overrepresented. In operation 720, the determination module 220 performs a statistical analysis of the tokens (e.g., tokens 350, 351, 352, 353, 354, 356, and 358) contained in the multiple descriptions 330. According to various example embodiments, the statistical analysis is purely statistical in nature and is executed without any semantic analysis or grammatical analysis that would attempt to discern actual meanings of various tokens and descriptors. In alternative example embodiments, the statistical analysis includes one or more preprocessing tasks, such as, for example, elimination of common stock words (e.g., "the," "for," "here," or "there"), normalization of plurals or alternatives (e.g., reducing "computers" to "computer," or equating "boating" with "boats"), recognizing multi-token phrases (e.g., "New York," "machine learning," or "cloud computing"), or any suitable combination thereof. One or more of operations 722 and 724 may be performed as part (e.g., a precursor task, a subroutine, or a portion) of operation 720. That is, the statistical analysis performed in operation 722 may include one or more of operations 722 and 724.

In operation 722, the determination module 220 generates a specific occurrence model of the token 350. The specific occurrence model represents one or more probabilities of occurrence of the token 350 within the multiple descriptions 330. In other words, the probabilities that the token 350 will occur within the tokens (e.g., tokens 350, 351, 352, 353, 354, 356, and 358) of the multiple descriptions 330 may be modeled in the specific occurrence model (e.g., a first occurrence model) of the token 350.

In operation 724, the determination module 220 generates a global occurrence model of the token 350 (e.g., global with respect to the entity profile management system 105, which may form all or part of a network-based system). The global occurrence model represents one or more probabilities of occurrence of the token 350 within all tokens of all descriptions (e.g., including the multiple descriptions 330) accessible by the access module 210. That is, the probabilities that the token 350 will occur within the tokens of all descriptions of all users (e.g., including the multiple users 320) of the entity profile management system 105 may be modeled in the local occurrence model (e.g., a reference occurrence model) of the token 350. A set of all users may be a superset of the multiple users 320 discussed above with respect to FIGS. 2-5. In other words, the set of all users may include the multiple users 320.

In some example embodiments, the determination module 220 performs operation 724 by accessing a predetermined global occurrence model of the token 350 (e.g., as a reference occurrence model of the token 350), instead of generating the global occurrence model. For example, a predetermined global occurrence model may be stored in the database 115 for accessed in operation 724.

In operation 730, the determination module 220 determines a statistical divergence (e.g., a Kullback-Liebler divergence or a pointwise mutual information (PMI) computation) between the specific occurrence model (e.g., as a first occurrence model) and the global occurrence model (e.g., as a reference occurrence model) of the token 350. As noted above, the specific occurrence model of the token 350 may be generated in operation 722. Moreover, the global occurrence model of the token 350 may be generated in operation 724 or accessed (e.g., from the database 115) in operation 724.

As shown in FIG. 8, the method may include one or more of operations 810, 840, 850, 860, and 870. Operation 810 may be performed prior to operation 610. In operation 810, the search results module 250 receives a search request (e.g., from the device 120 (e.g., as submitted by the user 122). The search request may be devoid of the token 350 (e.g., as an overrepresented token among the tokens of the multiple descriptions 330). That is, the token 350 may be absent from the search request. In some example embodiments, the accessing of the multiple descriptions 330 in operation 610 is performed in response to the search request received in operation 810.

In response to the search request received in operation 810, the search result module 250 may execute one or more search queries and obtain one or more search results. In some example embodiments, one or more of the multiple descriptions 330 (e.g., description 332) are returned in the one or more search results. One or more of the search results may reference the target entity 310. For example, a search result may be a hyperlink to the primary description 312 of the target entity 310. As another example, a search result may be a summary or excerpt of the primary description 312 of the target entity 310. The search result module 250 may perform these actions as part of operation 810 or as a separate operation in response to operation 810.

In operation 840, the search result module 250 presents a search result that references the target entity 310. The presentation of the search result may be based on the supplemental description 410 generated in operation 630 (e.g., based on the supplemental description 410 in conjunction with one or more search criteria or keywords). As noted above, the supplemental description 410 may describe the target entity 310 and may include the token 350, which in various example embodiments may be an overrepresented token that describes the target entity 310 and the subset 321 of the multiple users 320. Operation 840 may be performed in response to the search request received in operation 810.

In operation 850, the search result module 250 ranks the search result that references the target entity 310 (e.g., ranks the search result, among multiple search results, for relevance based on the supplemental description 410). The ranking of the search result may include ordering the search result (e.g., in a list of search results), prioritizing the search result (e.g., among multiple pages of search results), emphasizing or highlighting (e.g., using color, emphasis, or animation) the search result, or any suitable combination thereof. The ranking of the search result may be based on the supplemental description 410 generated in operation 630. As noted above, the supplemental description 410 may describe the target entity 310 and may include the token 350, which in various example embodiments may be an overrepresented token that describes the target entity 310 and the subset 321 of the multiple users 320. Operation 850 may be performed in response to the search request received in 810.

In operation 860, the recommendation module 260 provides a recommendation of the target entity 310. That is, the recommendation module 260 may provide a message that contains the recommendation of the target entity 310 (e.g., to the device 120 for viewing by the user 122). The providing of the recommendation may be based on the supplemental description 410 generated in operation 630. As noted above, the supplemental description 410 may describe the target entity 310 and may include the token 350, which in various example embodiments may be an overrepresented token that describes the target entity 310 and the subset 321 of the multiple users 320. Operation 860 may be performed in response to one or more indications received from the device 120 (e.g., explicitly or implicitly submitted by the user 122) that the user 122 may be interested in the token 350 or information contained therein.

In operation 870, the recommendation module 260 provides a suggestion that the primary description 312 of the target entity 310 be modified. In other words, the recommendation module 260 may provide a message that contains the suggestion. The message may suggest that the primary description 312 be modified based on the token 350, as determined in operation 620. Moreover, the suggestion may be provided to a device (e.g., device 120) of a user (e.g., user 122) authorized to act on behalf of the target entity 310 (e.g., authorized to maintain the primary description 312 of the target entity 310). In some example embodiments, the suggestions provided to an author of the primary description 312. The providing of the suggestion may be based on the supplemental description 410 generated in operation 630. As noted above, the supplemental description 410 may describe the target entity 310 and may include the token 350, which in various example embodiments may be an overrepresented token that describes the target entity 310 and the subset 321 of the multiple users 320. Operation 870 may be performed in response to the generation of the supplemental description 410 in operation 630.

According to various example embodiments, one or more of the methodologies described herein may facilitate generation of one or more supplemental description of one or more entities. Moreover, one or more of the methodologies described herein may facilitate enhancement, augmentation, or replacement of an entity's description with a generated supplemental description of that entity. Hence, one or more the methodologies described herein may facilitate retrieval and presentation of information regarding the entity, as well as proactive recommendations of the entity and suggestions to update the description of the entity.

When these effects are considered in aggregate, one or more of the methodologies described herein may obviate a need for certain efforts or resources that otherwise would be involved in generating a supplemental description of an entity. Efforts expended by a user in identifying information descriptive of an entity may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 9:
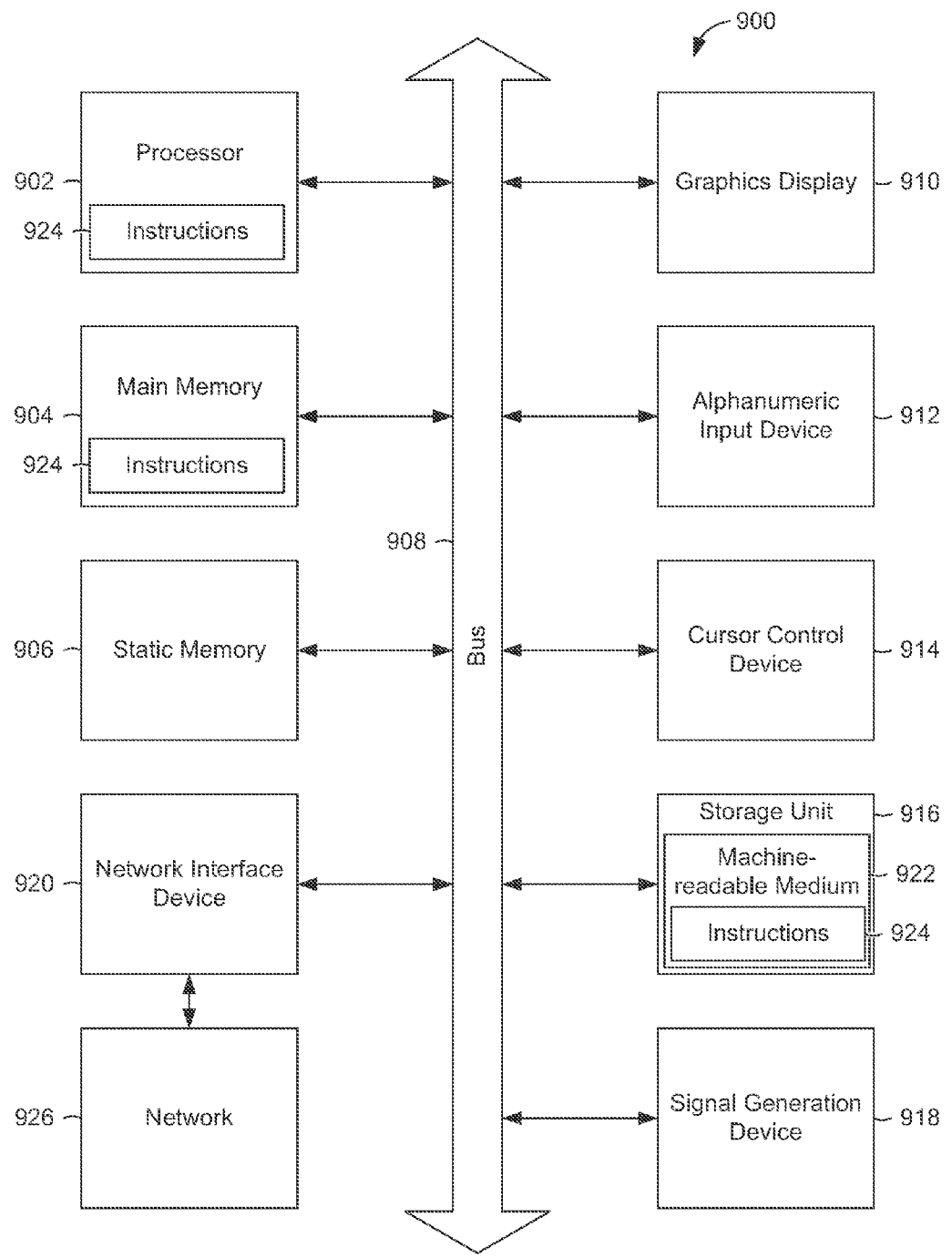
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 190) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    by an access module that comprises one or more processors of a machine, accessing textual submissions contributed by members of a social network managed by a social network system, each of the textual submissions referencing a common entity described by an entity profile stored by the social network system, a subset of the accessed textual submissions each including a common token that is absent from the entity profile;
    by a determination module that comprises one or more processors of the machine:
        generating a first probability that the common token occurs within the accessed textual submissions;
        accessing a second probability that the common token occurs within a superset of textual submissions that includes the accessed textual submissions; and
        determining that the common token is descriptive of the common entity based on a statistical divergence between the first and second probabilities, the statistical divergence indicating that the common token is overrepresented among other tokens common to the accessed textual submissions; and
    by a generation module that comprises one or more processors of the machine;
    generating a supplemental profile that describes the common entity and includes the overrepresented common token.

2. The method of claim 1, wherein:
    the entity profile indicates that the common entity is a business; and
    the accessed textual submissions are contributed by employees of the business.

3. The method of claim 1, wherein:
    the entity profile indicates that the common entity is a first member of the social network; and
    the accessed textual submissions are contributed by second members of the social network, the social network indicating that the second members are connected to the first member.

4. The method of claim 1, wherein:
    the entity profile indicates that the common entity is a group of members of the social network; and
    the accessed textual submissions are contributed by members that are included in the group of members of the social network.

5. The method of claim 1, wherein:
    the entity profile indicates that the common entity is an event scheduled in a calendar database that indicates attendees of the event; and
    the accessed textual submissions are contributed by members that are attendees of the event.

6. The method of claim 1, wherein:
    the entity profile indicates that the common entity is an available job at a business; and
    the accessed textual submissions are contributed by members that are applicants to the available job at the business.

7. The method of claim 1, wherein:
    the entity profile indicates that the entity is a news article having viewers; and
    the accessed textual submissions are contributed by members that are viewers of the news article.

8. The method of claim 1, wherein:
    the entity profile indicates that the entity is a discussion in an online forum having participants; and
    the accessed textual submissions are contributed by members that are participants in the discussion in the online form.

9. The method of claim 1, further comprising:
    displaying a search result that references the common entity, the displaying of the search result being based on the generated supplemental profile that describes the common entity and includes the overrepresented common token.

10. The method of claim 1, further comprising:
    ranking a search result that references the common entity, the ranking of the search result being based on the generated supplemental profile that describes the common entity and includes the overrepresented common token.

11. The method of claim 1, further comprising:
    providing a recommendation that recommends the common entity the providing of the recommendation being based on the generated supplemental description that describes the common entity and includes the overrepresented common token.

12. The method of claim 1, further comprising:
    providing a suggestion that the entity profile be modified based on the overrepresented common token determined to be descriptive of the common entity.

13. The method of claim 12, wherein:
    the providing of the suggestion includes communicating the suggestion to an author of the entity profile.

14. A non-transitory machine-readable storage medium comprising instructions that, when executed by one or more processors of a machine, cause the machine to perform operations comprising:
    accessing textual submissions contributed by members of a social network managed by a social network system, each of the textual submissions referencing a common entity described by an entity profile stored by the social network system; a subset of the accessed textual submissions each including a common token that is absent from the entity profile;
    generating a first probability that the common token occurs within the accessed textual submissions;
    accessing a second probability that the common token occurs within a superset of textual submissions that includes the accessed textual submissions;
    determining that the common token is descriptive of the common entity based on a statistical divergence between the first and second probabilities, the statistical divergence indicating that the common token is overrepresented among other tokens common to the accessed textual submissions; and
    generating a supplemental profile that describes the common entity and includes the overrepresented common token.

15. The non-transitory machine-readable storage medium of claim 14, wherein the operations further comprise:
    displaying a search result that references the common entity, the displaying of the search result being based on the generated supplemental profile that describes the common entity and includes the overrepresented common token.

16. The non-transitory machine-readable storage medium of claim 14, wherein the operations further comprise:
    ranking a search result that references the common entity, the ranking of the search result being based on the generated supplemental profile that describes the common entity and includes the overrepresented common token.

17. A system comprising:
one or more processors; and
a memory storing instructions that, when executed by at least one processor among the one or more processors, cause the system to perform operations comprising:
accessing textual submissions contributed by members of a social network managed by a social network system, each of the textual submissions referencing a common entity described by an entity profile stored by the social network system, a subset of the accessed textual submissions each including a common token that is absent from the entity profile;
generating a first probability that the common token occurs within the accessed textual submissions;
accessing a second probability that the common token occurs within a superset of textual submissions that includes the accessed textual submissions;
determining that the common token is descriptive of the common entity based on a statistical divergence between the first and second probabilities, the statistical divergence indicating that the common token is overrepresented among other tokens common to the accessed textual submissions; and
generating a supplemental profile that describes the common entity and includes the overrepresented common token.

18. The system of claim 17, wherein the operations further comprise:
providing a recommendation that recommends the common entity, the providing of the recommendation being based on the generated supplemental description that describes the common entity and includes the overrepresented common token.

19. The system of claim 17, wherein the operations further comprise:
providing a suggestion that the entity profile be modified based on the overrepresented common token determined to be descriptive of the common entity.

20. The system of claim 17, wherein:
the providing of the suggestion includes communicating the suggestion to an author of the entity profile.

* * * * *

UNITED STATES PATENT AND TRADEMARK OFFICE
CERTIFICATE OF CORRECTION

PATENT NO. : 9,965,812 B2  
APPLICATION NO. : 15/159516  
DATED : May 8, 2018  
INVENTOR(S) : Bhasin et al.

Page 1 of 1

It is certified that error appears in the above-identified patent and that said Letters Patent is hereby corrected as shown below:

On the Title Page

In item (*), in "Notice", in Column 1, Line 3, delete "days. days." and insert --days.-- therefor In the Claims In Column 15, Line 29, in Claim 1, delete "machine;¶" and insert --machine,-- therefor In Column 16, Line 21, in Claim 11, after "entity", insert --,--

In Column 16, Line 40, in Claim 14, delete "system;" and insert --system,-- therefor Signed and Sealed this
Twenty-eighth Day of May, 2019

Andrei Iancu
*Director of the United States Patent and Trademark Office*